United States Patent [19]

Tomantschger et al.

[11] Patent Number: 5,424,145

[45] Date of Patent: Jun. 13, 1995

[54] HIGH CAPACITY RECHARGEABLE CELL HAVING MANGANESE DIOXIDE ELECTRODE

[75] Inventors: Klaus Tomantschger; R. James Book, both of Mississauga; Josef Daniel-Ivad, Richmond Hill, all of Canada

[73] Assignee: Battery Technologies Inc., Richmond Hill, Canada

[21] Appl. No.: 207,629

[22] Filed: Mar. 9, 1994

Related U.S. Application Data

[63] Continuation-in-part of Ser. No. 115,356, Sep. 2, 1993, abandoned, which is a continuation of Ser. No. 853,265, Mar. 18, 1992, abandoned.

[51] Int. Cl.$^6$ .................................... H01M 10/24
[52] U.S. Cl. .................................... 429/57; 429/144; 429/217; 429/224; 429/229
[58] Field of Search .............. 429/224, 229, 230, 231, 429/206, 57, 60, 53, 144, 164, 216, 217, 249

[56] References Cited

U.S. PATENT DOCUMENTS

| | | | |
|---|---|---|---|
| 2,935,547 | 5/1960 | Kordesch | 136/86 |
| 2,962,540 | 11/1960 | Kordesch | 136/123 |
| 2,993,947 | 7/1961 | Leger | 136/107 |
| 3,113,050 | 12/1963 | Kordesch et al. | 136/123 |
| 3,530,496 | 9/1970 | Amano et al. | 136/30 |
| 3,716,411 | 2/1973 | Ogawa et al. | 429/224 X |
| 3,856,576 | 12/1974 | Prieto | 136/139 |
| 3,884,722 | 5/1975 | Tucholski | 429/224 X |
| 4,091,178 | 5/1978 | Kordesch | 429/60 |
| 4,275,127 | 6/1981 | Ritterman et al. | |
| 4,312,928 | 1/1982 | Van Deutekom | |
| 4,451,543 | 5/1984 | Dzieciuch et al. | |
| 4,857,424 | 8/1989 | Larsen et al. | |
| 4,863,817 | 9/1989 | Ogino et al. | |
| 4,865,927 | 9/1989 | Laig-Horstebrock et al. | 429/50 |
| 4,925,747 | 5/1990 | Kordesch et al. | 429/59 |
| 4,957,827 | 9/1990 | Kordesch et al. | 429/60 |
| 5,011,752 | 4/1991 | Kordesch | 429/206 |
| 5,034,291 | 7/1991 | Jacus | 429/206 |
| 5,043,234 | 8/1991 | Tomantschger et al. | |
| 5,162,169 | 11/1992 | Tomantschger et al. | 429/59 |

FOREIGN PATENT DOCUMENTS 9318557 9/1993 WIPO.

OTHER PUBLICATIONS

"Batteries", vol. 1, published 1974 by Marcel Dekker Inc., New York.
Journal of Electrochemical Society, vol. 115, No. 4, pp. 333 thru 338 (1968) Boden et al. "The Alkaline Manganese Dioxide Electrode".
Journal of Power Sources, 16 (1985) month not available, pp. 1 thru 43, Desai et al. "Manganese Dioxide—A Review of a Battery Chemical, etc. ...".
Falk & Salkind, Alkaline Storage Batteries published by John Wiley & Sons, New York, 1969, pp. 180 thru 185 & pp. 367 thru 370.
Electrochemical Power Sources, IEE, (1980) month not available, pp. 95 & 96, Barak.

*Primary Examiner*—Anthony Skapars
*Attorney, Agent, or Firm*—Donald E. Hewson

[57] ABSTRACT

A rechargeable manganese dioxide/zinc cell is provided, where the cell has high capacity, high volumetric and gravimetric energy densities, high cycle life, and is capable of continued charge-discharge cycles following an overdischarge. The cell has an aqueous electrolyte, with the usual solute of potassium hydroxide, but the solute may also be a mixture of zinc chloride and ammonium chloride. The electrode balance as determined by the ration of the theoretical discharge capacity of the zinc and the theoretical one electron discharge capacity of the manganese dioxide ranges from greater than 65% up to 110%. On the 15th discharge, a cell of the present invention will deliver a discharge capacity of at least 20% of the discharge capacity delivered on the first discharge. A cell according to the present invention is capable of continued charge-discharge cycles after overdischarge or voltage reversal.

18 Claims, 1 Drawing Sheet

HIGH CAPACITY RECHARGEABLE CELL HAVING MANGANESE DIOXIDE ELECTRODE

CROSS REFERENCE

This application is a Continuation-In-Part of application Ser. No. 08/115,356 filed Sep. 2, 1993, (now abandoned) which was a File Wrapper Continuation of application Ser. No. 07/853,265 filed Mar. 18, 1992 (now abandoned).

FIELD OF THE INVENTION

This invention relates to rechargeable cells having a manganese dioxide positive electrode, a potassium hydroxide or zinc chloride/ammonium chloride electrolyte and metallic zinc as the negative electrode material. The theoretical discharge capacity of the zinc contained in the negative electrode is in the range of from 65% to 110% of the theoretical one electron discharge capacity of the $MnO_2$ in the positive electrode. The usual embodiment may be the typical "bobbin" type cylindrical cell, however spirally wound cells, button or coin cells, and flat plate cells may be provided in keeping with the present invention.

BACKGROUND OF THE INVENTION

For purposes of the present discussion, the capacity on the first discharge of the $MnO_2$ contained in the positive electrode between the $MnO_2$ status and the MnOOH status is termed or designated as the theoretical one electron discharge capacity of the manganese dioxide electrode, which is 308 m Ah/g of manganese dioxide. If the discharge process of the $MnO_2$ positive electrode continues beyond the MnOOH level, an irreversible phase change has been reported to occur, so that the manganese dioxide electrode is no longer fully rechargeable.

Specifically, the following equation is descriptive of the discharge reaction which takes place as the $MnO_2$ discharges towards its MnOOH status in the presence of an aqueous electrolyte.

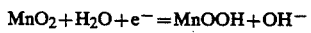

Discharge according to this reaction occurs with essentially no phase change. If the discharge process of the manganese dioxide positive electrode continues beyond the MnOOH level, an irreversible phase change has been reported to occur, so that the manganese dioxide electrode is no longer dully rechargeable. Such phase change must be avoided. Responsible for the phase change is the following reaction:

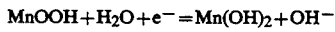

However, particularly with reference to practical aqueous manganese dioxide/zinc cells, discharge according to this reaction occurs at a voltage which is too low to contribute to the useful service life of the cell, since it occurs below 0.8 volts.

To provide rechargeable alkaline manganese dioxide/zinc cells, there have been a number of steps taken to ensure rechargeability; and specifically, steps have been taken to severely limit the discharge of the $MnO_2$ to a fraction of the one electron discharge by limiting the capacity of the zinc electrode accordingly.

Historically, rechargeable alkaline $MnO_2$/Zn cells that have been brought to the market in the late 1960's and early 1970's were not successful because of the constraints placed upon them. Those constraints included the use of electronic controls to cut off the discharge after a certain time of use to not permit discharge beyond the MnOOH level. In general, such cells were merely modified primary alkaline manganese dioxide/zinc cells, and generally they had the same ratio of Zn metal in the negative electrode to $MnO_2$ in the positive electrode as primary cells and, therefore, had a very limited cycle life. Once a battery of cells in series had been discharged to 0 Volt, the cells were no longer rechargeable. Such cells were also quite low in respect of their energy densities: For example, a rechargeable D cell may have been rated at only 2 Ah. A more full discussion of the above is found in FALK and SALKIND *Alkaline Storage Batteries*, published by John Wiley & Sons, New York, 1969, at pages 180 to 185, and also pages 367 to 370.

So as to overcome the recharge problems of the $MnO_2$, as noted above, cells were developed by which the discharge capacity of the cell was limited by imposing a zinc negative electrode limitation—by which it was made impossible to discharge the $MnO_2$ to more than a fraction of the one electron discharge capacity of the negative electrode. For example, the discharge capacity of the zinc negative electrode was limited by design to be no more than about 30% of the one electron discharge capacity of the $MnO_2$ in the positive electrode. This preserved the rechargeable characteristics of the cell, but resulted in a cell having quite low deliverable energy capacity and density. Those limitations, understandably, mitigated against the commercial acceptability of such cells.

Reference is made to AMANO et al U.S. Pat. No. 3,530,496, issued Sep. 22, 1970. AMANO et al make a very strong statement of their intent to limit the depth of discharge of the $MnO_2$ electrode by providing a zinc electrode that has its capacity limited to between 20% to 30% of the one electron discharge capacity of the $MnO_2$ in the positive electrode. It should be noted that the concept of electrode balance is well known, and for the cells discussed it is the ratio of the theoretical discharge capacity of the metallic zinc in the negative electrode with respect to the theoretical one electron discharge capacity of the manganese dioxide in the positive electrode. AMANO et al shows, in FIG. 8 of that patent, the capacity decay vs. cycle of "D" size cells in cases where the depth of discharge of the $MnO_2$ electrode is set at 100%, 50%, 30%, 20% and 10% of the theoretical one electron $MnO_2$ discharge capacity. The target depth of discharge of the $MnO_2$ electrode is set by varying the theoretical capacity of the negative electrode. All "D" size test cells were cycled until their discharge capacity fell below 0.5 Ah, that is below an energy density of about 4 Wh/kg of cell weight. Using a 50% electrode balance, AMANO et al report an initial cell capacity of 4.5 Ah, which degrades to 0.5 Ah within 15 cycles. In other words, the 15th cycle capacity represents 11% of the first cycle capacity. Based on the negative findings of this experiment, AMANO et al conclude that an electrode balance exceeding 30% of the theoretical one electron $MnO_2$ discharge capacity produces a cell with a cycle life which is too low to be commercially viable. In their Table 1, AMANO et al list the number of cycles achieved in their experiments to an end of life discharge capacity of 0.5 Ah—that is, 3.6 Ah/kg—as a function of the cell balance. They report the service life of the cell as being only 6 cycles at 100% balance, 15 cycles at 50% balance, 35 cycles at 30% balance, 84 cycles at 20% balance, and over 99 cycles at 10% balance. These results have led AMANO et al to the conclusion that an electrode balance exceeding 30% of the theoretical one electron $MnO_2$ discharge capacity results in a cell that has poor performance characteristics.

OGAWA et al, in U.S. Pat. No. 3,716,411, issued Feb. 13, 1973, teach a rechargeable alkaline manganese cell with the discharge capacity of the zinc electrode controlled within a range so as to ensure the recharge capability of the $MnO_2$ electrode. The zinc electrode and $MnO_2$ electrode face each other through a gas permeable and dendrite impermeable separator. However, the OGAWA et al cell is strictly negative electrode limited in that the capacity of the zinc electrode is held to be not more than about 40% of the theoretical one electron discharge capacity of the manganese dioxide in the positive electrode. OGAWA et al discuss the fact that if a manganese dioxide/zinc cell is discharged to below 0.9 volts and down to about 0.75 volts, and where the capacity of the zinc negative electrode is about the same or slightly smaller than that of the manganese dioxide positive electrode, then the recharge capability of the manganese dioxide strongly deteriorates. OGAWA et al provide that under no conditions should the depth of discharge of the zinc electrode be permitted to exceed 60% of the theoretical one electron discharge capacity of the manganese dioxide positive electrode.

KORDESCH, in U.S. Pat. No. 4,091,178, issued May 23, 1978, also provides a rechargeable $MnO_2$/Zn cell where the theoretical discharge capacity of the zinc negative electrode is specifically limited to about 33% of the one electron discharge capacity of the positive electrode. However, KORDESCH also provides what he calls a "charge reserve mass", in which a quantity of zinc oxide is placed that is equal to at least 50% of the discharge capacity of the metallic zinc in the negative electrode. The energy density of the KORDESCH cell is quite low.

Tomantschger et al, in a commonly owned U.S. patent application Ser. No. 07/893,793 filed Jun. 4, 1992, provide rechargeable alkaline manganese zinc cells that utilize an $MnO_2$ positive electrode and a zinc negative electrode, wherein the discharge capacity of the zinc electrode is limited to from greater than 60% and up to 100% of the theoretical one electron discharge capacity of the $MnO_2$. That provides a rechargeable alkaline manganese cell having higher capacity and higher energy density than has been available from the prior art cells.

OBJECTIVE OF THE INVENTION

The purpose of this invention is to provide a rechargeable alkaline manganese dioxide-zinc cell which has the following features:
a high discharge capacity on its first discharge;
a long cycle life;
the ability to recuperate from overdischarge without an excessive performance loss on further cycling; and
the ability to be used as power source in appliances without the requirement to employ devices for cutting off discharge of the cell or batteries at a predetermined limit.

The present invention accomplishes these objectives by determining the optimum electrode balance range where the electrode balance is defined as the ratio of the theoretical discharge capacity of the Zn active material of the negative electrode to the theoretical one electron discharge capacity of the $MnO_2$ active material contained in the positive electrode. The influence of various electrode balances on the initial discharge capacity and the cycle life as well as the ability to recuperate following an overdischarge were determined. The reason for this determination was the fact that users of batteries sometimes forget to switch off a battery powered device so that current will flow until the battery voltage reaches zero Volts. A battery generally consists of a series of connected cells; e.g. four cells in series for a 6 Volt battery. On overdischarge of a 6 Volt battery, current is driven through a weak cell (or cells) with the result of oxygen evolution on the totally discharged zinc electrode and/or hydrogen evolution on the overdischarged manganese dioxide electrode. The consequence of such an overdischarge is typically bulging and/or leakage and/or the loss of cycle life.

What the present invention provides is rechargeable manganese dioxide/zinc cells with an aqueous electrolyte which have a high capacity relative to prior art cells. A separator between the zinc electrode and the manganese dioxide electrode, and appropriate terminal means contacting the zinc electrode and manganese dioxide electrode are provided. As noted above, the discharge capacity of the manganese dioxide electrode between the $MnO_2$ status and the $MnOOH$ status is termed the theoretical one electron discharge capacity of that electrode.

The present invention also contemplates an aqueous electrolyte containing potassium hydroxide or a mixture of zinc chloride and ammonium chloride.

To reduce the mobility of zincate in the alkaline electrolyte by precipitation, the negative electrode may contain between 0.5% and 25% of an additive chosen from the group consisting of magnesium, barium and calcium, their oxides and hydroxides.

In keeping with the provisions of the present invention, the theoretical discharge capacity of the zinc negative electrode is in the range of from 65% and up to 110% of the theoretical one electron discharge capacity of the manganese dioxide electrode.

In a typical embodiment of cells according to the present invention, where the cells are intended for commercial exploitation, the electrolyte is a 4N to 12N aqueous solution of potassium hydroxide.

Cells according to the present invention may have a number of additives for purposes of enhancing the conductivity and the structural integrity of the $MnO_2$ positive electrode, or for inhibiting oxygen evolution or hydrogen evolution. For example, the $MnO_2$ electrode may include at least one additive which is chosen from the group consisting of 5% to 15% by weight of graphite, 0.1% to 15% by weight of carbon black, an inorganic binder, and/or an organic binder. The binder materials may be present in the range of from 0.1% to 15% by weight of the $MnO_2$ electrode. The carbon black may be present as a porous additive in the $MnO_2$ electrode in the range of from 0.1% to 15% by weight thereof.

Generally, the positive electrode of cells in keeping with present invention will include a barium-based additive in an amount of from about 3.0% to about 25% by weight of the positive electrode. The addition of a barium compound has been found to have a beneficial effect on the cycle life of the cell. Typically, such barium compounds may be such as $BaSO_4$, $BaO$, and $Ba(OH)_2$.

To promote hydrogen gas recombination within the positive electrode, the positive electrode composition may include hydrogen recombination catalysts such as those taught in commonly owned U.S. Pat. No. 5,162,169, issued Nov. 10, 1992. Still further, so as to provide for overcharge capability, oxygen recombination techniques such as those taught in commonly owned U.S. Pat. No. 5,043,234, issued Aug. 27, 1991, to Tomantschger et al, may be utilized. To enhance the overcharge capability of the manganese dioxide electrode, catalysts may be added to it to facilitate oxygen evolution. Any catalyst must be stable over a wide voltage range—typically from 0.9 volts versus Zn to 2.0 volts versus Zn—and also over a wide temperature range—typically from $-40°$ C. to $+70°$ C.—without any significant deterioration in performance of the cell. Such catalysts may be at least one of an oxide, spinel, or perovskite of nickel, cobalt, aluminum, zinc, iron, manganese, chromium, vanadium, titanium, and silver.

Still further, for purposes of improved hydrogen transfer, the positive electrode composition may further comprise from about 0.1% to 15% of a hydrophobic additive such as PTFE, polyethylene, or polypropylene, together with an additional porous additive such as from about 0.1% to 15% of carbon black. Such additives improve the gas transport characteristics of the positive electrode, and thereby enhance the hydrogen recombination rate.

The manganese dioxide electrode may comprise from 0.1% to 5% of a hydrogen recombination catalyst such as one chosen from the group consisting of silver, oxides of silver, and compounds of silver, as described in U.S. Pat. No. 5,162,169, issued Nov. 10, 1992, to Tomantschger et al.

Depending on the nature of the cell, the positive electrode may be molded into pellets and inserted into the can, followed optionally by recompaction. Otherwise, the positive electrode may be extruded directly into the can, or it may be rolled or cast as a flat positive electrode for use in flat plate cells, button or coin cells.

BRIEF DESCRIPTION OF THE DRAWINGS

The present invention is described hereafter, in association with the accompanying drawings, in which.

DESCRIPTION OF THE PREFERRED EMBODIMENTS

Figure 1:
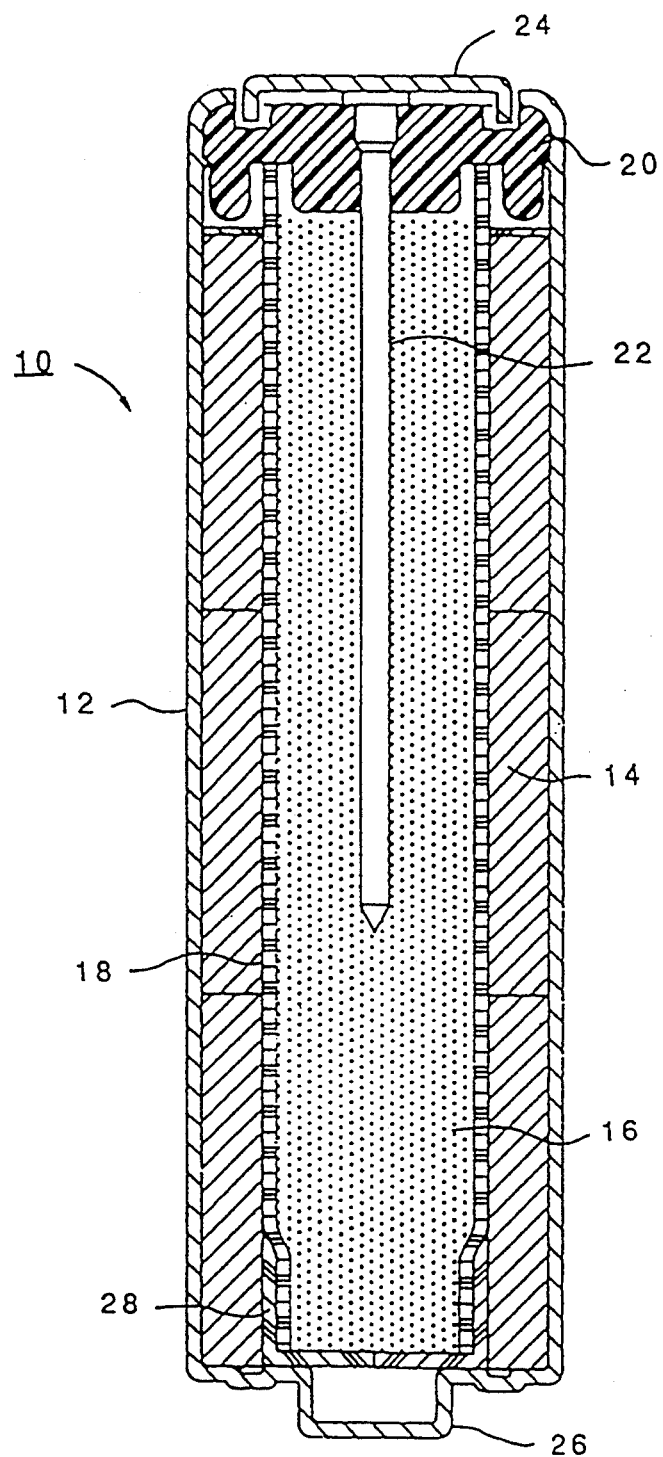
FIG. 1 is a typical cylindrical cell in which the present invention may be embodied.

Referring to FIG. 1, a typical cylindrical cell is shown at 10. The cell comprises a container 12, within which is a manganese dioxide positive electrode 14 and a zinc negative electrode 16. The container 12 is a nickel plated deep drawn steel can, although other suitable metal cans may be used. So as to improve the contact and conductivity between the positive electrode 14 and the can 12, and thereby so as to reduce the internal resistance of the cell, the internal surface of the container 12 may be coated with a conductive carbon coating such as LONZA TM.

The manganese dioxide positive electrode 14 may be placed into the container 12 by such ordinary cell manufacturing techniques as by being molded into discrete pellets, and then placed in the container 12, or by being extruded into the container. It is generally comprised of manganese dioxide, to which a variety of optional additives may be mixed, as discussed hereafter. Typically the $MnO_2$ is electrolytic manganese dioxide to which optionally at least one hydrogen recombination catalyst has been added. Chemically synthesized $MnO_2$ may also be used.

A suitable manganese oxide positive electrode for use in a rechargeable cell is described in U.S. Pat. No. 5,300,371 issued Apr. 15, 1994 (unconstrained balance CIP). Suitable active materials utilizing manganese oxides comprise e.g. electrolytically or chemically synthesized manganese dioxide containing typically over 90% of four valent manganese and minor amounts of lower valance oxides. Alternatively manganese oxides can comprise a mixture of manganese dioxide and MnOOH or comprise bismuth modified manganese oxides. In the case manganese oxides are used as active material in the positive electrode typically 1 to 15% of graphite or carbon black are added to the electrode as well as minor amounts of a hydrophobic lubricant such as polytetrafluoroethylene or a stearate. To improve the cycling performance of the manganese oxide electrode the addition of various compounds such as barium oxide, hydroxide or sulphate in the range from 3% to 15% are desired.

For the purpose of hydrogen recombination typically 0.01% to 10% of suitable hydrogen recombination catalyst can be added to the positive electrode. Effective catalysts include silver, its oxides, and compounds as well as alloys of metals capable of absorbing hydrogen such as nickel, iron, lanthanum, titanium.

Between the positive electrode and the negative electrode there is located a separator 18. The cell is closed by the closure member 20, through which a current collector 22 extends into the negative electrode 16. The current collector or nail 22 contacts a metal negative cap 24 which is placed or welded across the head of the nail, and across the closure member 20, thereby providing a negative terminal for the cell 10. At the other end of the cell there is formed a pip 26, and it provides the positive terminal for the cell. It is evident that the can 12 contacts the positive electrode 14 whereas only the cap 24 through nail 22 contacts the negative electrode 16. To preclude short circuit within the cell, the pip 26 is insulated from the negative electrode 16 by an insulating washer or bottom cup 28.

The closure member 20 is normally formed of a plastic material, and contains a safety vent (not shown) which may be simply a rupturable membrane, or a resealable vent. The plastic closure member is moulded from a thermoplastic material such as polyethylene and/or polypropylene, talc filled polypropylene, polysulfone, nylon, and the like.

It is evident that similar or appropriate structures, providing negative and positive electrodes respectively connected to negative and positive terminals for the cell, and separated by an appropriate separator, may be provided in spirally wound cells, flat plate cells, and button or coin cells.

Within the cell, an aqueous electrolyte provides ionic paths so that the cell may be charged and discharged.

The separator 18 is generally a complex flexible structure which is impermeable to zinc dendrites, but which is permeable to ions and which may be permeable to the passage of gases such as hydrogen or oxygen that are produced within the cell on overcharge, standby, or overdischarge conditions. The separator may comprise an absorber made from cellulose, rayon, polyamide polypropylene, or polyvinylalcohol fibres, and a barrier which may consist of an ion permeable membranes made of cellulose, CELLOPHANE TM, or radiation grafted polyethylene, polypropylene, or the like. The ion permeable membrane prevents zinc dendrite growth that may short the electrodes. Other appropriate separator materials such as those sold in association with the trademarks CELGARD TM, ZAMM TM, and PERMION TM may be used, as well as multi-component designs that include an absorber and a barrier, laminated structures having several laminates, and so on.

The negative electrode 16 comprises powdered metallic zinc together with a suitable gelling agent such as carboxymethyl cellulose, polyacrylic acid, starches, and their derivatives. A charge reserve mass of ZnO—usually solid zinc oxide—and generally in the amount of from 1% to 20% by weight of the negative electrode, may optionally be used to compensate for losses due to the migration zincates from the negative to the positive electrode compartment of the cell.

Until recently, hydrogen generation of the zinc electrode was suppressed by amalgamating the zinc powder with up to 3% of mercury. However, demand is now created for environmentally friendly cells, whereby the amount of mercury employed is reduced to below 0.025% based on the cell weight. Indeed, it is desirable to ultimately eliminate the use of mercury altogether. To minimize the evolution of hydrogen gas, a low pollution negative electrode contains at least one additive in the range of 0.01% to 0.5% based on the weight of the zinc powder, which additive is selected from the group consisting of lead, gallium, bismuth, cadmium and indium metals or their compounds. These metals can be provided in a suitable zinc alloy, or alternatively the zinc powder can be treated to provide a surface deposit of the desired metals. Still further, the selected metal or metals, and/or their compounds may be added to the negative electrode composition during the gel processing step. Further yet, the selected metal or metals, and/or their compounds, may be added to the negative electrode composition during the gel processing step. Further yet, the selected metal compounds may be introduced via the electrolyte. Optionally, organic additives as surfactants in range of 0.01% to 0.5% may be employed to reduce dendrite formation and/or hydrogen gassing of the zinc electrode.

Zincate mobility within the cell may be reduced by the use of additives to the negative electrode mix such as 1% to 15% of compounds of magnesium, barium, and calcium, typically their oxides, or their hydroxides, or mixtures thereof. Oxygen gas recombining agents may also be added to the zinc negative electrode as are taught in commonly owned U.S. Pat. No. 5,043,234 issued Aug. 27, 1991.

The electrolyte is an aqueous alkali solution of usually 4N to 12N potassium hydroxide. The electrolyte may contain additives such as dissolved zinc oxide so as to reduce the gassing of the active zinc within the negative electrode, and so as to permit overcharge of the cell without damage to it. Also, as noted earlier, from 1% to 20% ZnO can optionally be included in the cell, as a charge reserve mass.

Other electrolytes effective with zinc electrodes are potassium hydroxide or a mixture of $ZnCl_2$ and $NH_4Cl$.

The electrical performance of cells is frequently compared in ampere-hours of discharge capacity delivered per cell of equal size at a specified discharge rate such as e.g. a 10 hour discharge rate. Frequently, the performance is compared in Wh of energy delivered by cells of equal size. To compare performance of cells of different size Wh of energy per kilogram of cell weight or Wh per liter of cell volume are compared.

EXAMPLE I

Test cells were constructed using the following electrode compositions:

| Positive electrode Composition | | Negative electrode Composition | |
|---|---|---|---|
| $MnO_2$ | 79.01 | Zn | 56.95 |
| Graphite, Carbon PTFE, $Ag_2O$ | 14.49 | CARBOPOL TM | 0.52 |
| 9N KOH | 6.50 | ZnO | 9.00 |
| | | 9N KOH, 5% ZnO | 33.53 |

* TM

The negative electrode according to the composition noted above is conveniently produced in the form of a gel containing metallic zinc powder and zinc oxide. The zinc oxide is introduced into the gel, either up to 10% dissolved in electrolyte and/or in an amount up to 20% by weight of the negative electrode as solid zinc oxide powder.

Groups of various different cylindrical AA alkaline manganese dioxide/zinc cells were manufactured in a way that the theoretical discharge capacity of the zinc electrode was 65%, 80%, 90%, 100%, 110%, 120%, or 130% of the theoretical one electron capacity of the manganese dioxide electrode. To accommodate the various electrode balances in the constant cell volume, the weights of the manganese dioxide and the zinc electrode were varied accordingly.

Then, one set of control cells from each of the balance sets was tested by continuously discharging the cell on a 10 ohm load resistor—representing a drain rate of about 15 mA/g of the $MnO_2$—to a cutoff voltage of 0.9 volts. After discharge, the control cells were recharged immediately.

A second set of cells was assembled into a four cell battery pack, in series. The battery pack was connected to a 39 ohm load resistor for one week. It should be noted that in general the useful cell capacity of the cells is exhausted within the first 15 hours of discharge when the battery pack voltage reaches 3.6 Volts. However, if the user forgets to switch off the device, the battery continues to discharge until its voltage reaches 0 Volt. Because all of the cells are not exactly equal in discharge capacity, one of the cells within the battery pack is driven to a negative voltage by the other cells which are still discharging. The weak cell is overdischarged.

After one week the four cell battery pack is disassembled, and each of the cells is recharged individually and then cycled on a ten ohm load to 0.9 volts cutoff, to determine to what degree cells of the various balance groups have retained their cycling capability.

Table 1 shows the average discharge capacity of the test cells on the initial discharge, the second discharge without and with overdischarge in a 6 Volt battery pack for one week as described above. The last column E contains the capability of cycling after overdischarge calculated as column D as a percentage of C.

TABLE 1

Performance Comparison of AA Test Cells Ranging in Electrode Balance from 65% to 130% with and without an Overdischarge on the Walkman Test (10Ω to .9V).

| A<br>Electrode<br>Balance<br>[Zn:MnO₂1e] | B<br>Initial<br>Discharge<br>Capacity to<br>.9V [mAh] | C<br>Second<br>Discharge<br>Capacity to<br>.9V [mAh] Without<br>Overdischarge | D<br>Second<br>Discharge<br>Capacity to<br>.9V After<br>Overdischarge<br>[mAh] | E<br>Retention of<br>Electrical<br>Cycling<br>Capability |
|---|---|---|---|---|
| 130% | 1614 | 1143 | 165 | 14% |
| 120% | 1583 | 1113 | 262 | 24% |
| 110% | 1571 | 1139 | 800 | 70% |
| 100% | 1547 | 1135 | 1310 | 115% |
| 90% | 1473 | 1079 | 1048 | 97% |
| 80% | 1353 | 998 | 862 | 86% |
| 65% | 1250 | 1125 | 1120 | 100% |

From a review of table 1 above it is evident that up to an electrode balance of 110%, a 70% to 115% retention of the cycling capability of cells following an overdischarge is observed. There is only very limited recovery when the electrode balance is above 110%, e.g. 14% and 24%.

Thus, it is apparent that substantially up to and including an electrode balance of 110% theoretical discharge capacity of the negative electrode with respect to the theoretical one electron discharge capacity of the manganese dioxide electrode, cells according to the present invention provide useful capacity, and are rechargeable and capable of retaining their cycling capability following an overdischarge.

EXAMPLE II

An important comparison between rechargeable cell designs is in respect of the theoretical energy capacities of the electrodes. Therefore, various designs of AA (LR06) cells according to the teachings in three prior art patents were compared with results of tests on cells constructed according to this invention. The theoretical energy densities were calculated as shown in Table 2. It should be noted that the comparisons are made on the basis of each of the cells having a total volume of 7.5 ml, a weight of 22.5 g, and an average discharge voltage of 1.25 volts. The theoretical capacities are in practise, achievable only at low discharge rates. Table 2 provides both the theoretical gravimetric and volumetric energy densities of the respective prior art cells; and included in Table 2 in all categories shown are cells in keeping with the present invention and as described in Example I.

It is clearly evident from table 2 that cells according to the present invention have substantially improved energy density when compared to AMANO, KORDESCH and OGAWA.

EXAMPLE III

Using the positive electrode and negative electrode compositions as described above with respect to Example I, the present invention was applied to AAA, AA, C, and D cells having conventional cylindrical cell configurations. The capacity in ampere-hours of cells in each size was determined, as noted below in Table 4, and the cells were optimized having the respective ratios of the zinc in the negative electrode to the MnO₂ in the positive electrode as noted in line 2 of Table 4. The ratios are stated with respect to the theoretical one electron discharge capacity of the MnO₂ present in the positive electrode.

It is seen from table 3 that the gravimetric energy densities generally range from about 115 Wh/kg to about 120 Wh/kg; and that the volumetric energy densities generally range from about 300 Wh/liter. Comparing with the respective values in table 2 of example 2, cells of the present invention have the gravimetric energy density improved by more than 50%, and the volumetric energy density by more than 43%. Four cells of each cell size AAA, AA, C, and D were connected in series into battery packs and each pack was discharged through a resistor of 39 ohms for seven days. All cells were recharged and then submitted to discharge-charge cycling. The retention of electrical cycling capability calculated as in example 1 exceeded 70% for all packs; this being further proof of utility of the present invention.

TABLE 2

AA Cell Design Comparisons
Prior Art Versus This Invention

| | AMANO<br>3,530,496 | KORDESCH<br>4,091,178 | OGAWA<br>3,716,411 | This<br>Invention | This<br>Invention |
|---|---|---|---|---|---|
| MnO₂{Ah} 1e⁻ | 2.234 | 2.261 | 2.136 | 2.760 | 2.136 |
| Zn{Ah} 2e⁻ | 0.670 | 0.746 | 1.282 | 1.930 | 2.136 |
| Cell{Ah} | 0.670 | 0.746 | 1.282 | 1.930 | 2.136 |
| Electrode Ratio | 30% | 33% | 60% | 70% | 100% |
| Theoretical Energy per Cell (Wh) | .877 | .933 | 1.602 | 2.413 | 2.670 |
| theor. Energy Density | | | | | |
| (Wh/kg) | 39 | 41 | 71 | 107 | 119 |
| (Wh/l) | 117 | 124 | 214 | 322 | 356 |

TABLE 3

Energy Densities of Cylindrical RAM Cells According to the Present Invention

|  | AAA | AA | C | D |
|---|---|---|---|---|
| Capacity [Ah] | 1.02 | 2.14 | 5.67 | 13.30 |
| Zn:1e$^-$ MnO$_2$ Ratio | 0.95 | 1.00 | 0.80 | 0.65 |
| theor. Energy Density |  |  |  |  |
| {Wh/kg} | 116 | 118 | 115 | 121 |
| {Wh/l} | 364 | 357 | 308 | 346 |

EXAMPLE IV

To demonstrate the cycling capability of cells in keeping with the present invention and having positive electrode and negative electrode compositions as noted below in Table 4 were constructed. However, one set of AA cells was constructed having a Zn to one electron MnO$_2$ discharge capacity ratio of about 65%; and the other set of AA cells was constructed having a negative electrode to one electron MnO$_2$ discharge capacity ration of about 110%. Those cells were then subjected to deep discharge tests at 3.9 Ohms—representing a six hour discharge rate—to a 0.8 volt cutoff. In each case, the cells were immediately recharged after discharge.

TABLE 4

Composition of Present Design Test Cells used in Example IV

| Positive electrode Composition | | Negative electrode Composition | |
|---|---|---|---|
| MnO$_2$ | 83.03 | Zn, ZnO | 65.00 |
| Graphite, Carbon, PTFE, Ag$_2$O | 10.47 | CARBOPOL | 0.50 |
| 9N KOH | 6.50 | 9N KOH, 5% ZnO | 34.50 |

Table 5 indicates the cycling performance obtained with the respective "AA" test cells on a 3.9Ω load resistance to a cut off of 0.80 V.

TABLE 5

3.9Ω Cycling Performance Comparison of AA Test Cells Having an Electrode Balance of 70% and 110% respectively.

|  | TEST CELL 1 70% ELECTRODE BALANCE [mAh] | TEST CELL 2 110% ELECTRODE BALANCE [mAh] |
|---|---|---|
| CYCLE 1 | 1169 | 1536 |
| CYCLE 5 | 943 | 980 |
| CYCLE 10 | 767 | 790 |
| CYCLE 15 | 680 | 650 |
| CYCLE 20 | 436 | 511 |

On their 15th discharge, the cells show a discharge capacity greater than 20% of their initial discharge capacity—well above the 11% landmark set by AMANO et al.

As noted, the present invention is applicable not only to conventional bobbin type cells, but it may also be applied to button or coin cells, and to flat plate cells.

What is claimed is:

1. A rechargeable electrochemical cell comprising a metallic zinc negative electrode, a manganese dioxide positive electrode, a separator between said zinc negative electrode and said MnO$_2$ positive electrode, terminal means contacting said negative electrode and said MnO$_2$ electrode to provide respective negative and positive terminals for said cell, and an aqueous electrolyte;

wherein the principal active component of said MnO$_2$ electrode is manganese dioxide having a first discharge capacity of up to 308 mAh per gram thereof, which discharge capacity is the theoretical one electron discharge capacity of said active MnO$_2$ electrode;

wherein the separator is a semipermeable membrane impermeable to zinc dendrites;

wherein the solute of said aqueous electrolyte is selected from the group consisting of potassium hydroxide, and a mixture of zinc chloride with ammonium chloride;

wherein the theoretical discharge capacity of said metallic zinc contained in the negative electrode is in the range of 65% to 120% of the theoretical one electron discharge capacity of MnO$_2$ contained in said positive electrode;

wherein said rechargeable cell has a discharge capacity on its 15th discharge which is greater than 20% of the discharge capacity delivered in the first discharge when the cell is discharged at a six hour discharge rate, and when said cell has been recharged immediately after discharge in each of its first to 14th discharge/charge cycles; and wherein said rechargeable cell retains at least 30% of its electrical cycling capability after an overdischarge to substantially zero Volts.

2. The rechargeable electrochemical cell of claim 1, wherein said theoretical discharge capacity of zinc in said negative electrode is in the range of from about 70% to about 110% of the theoretical one electron discharge capacity of manganese dioxide in said positive electrode.

3. The rechargeable electrochemical cell of claim 1, wherein said aqueous electrolyte is 4N to 12N potassium hydroxide.

4. The rechargeable electrochemical cell of claim 1, wherein said positive electrode includes from about 3% to about 25% by weight thereof of a barium compound.

5. The rechargeable electrochemical cell of claim 3, wherein said MnO$_2$ electrode includes at least one additive selected from the group consisting of 5% to 15% by weight of graphite, 0.1% to 15% by weight of carbon black, an inorganic binder, and an organic binder.

6. The rechargeable electrochemical cell of claim 3 when of cylindrical shape, wherein said manganese dioxide positive electrode is obtained by pressing discrete rings, inserting the rings into close contact with the inner surface of a cylindrical metal can and then optionally recompacting the pellets with the metal can, or wherein a granulated electrode material is molded directly into the can to obtain a similarly shaped electrode.

7. The rechargeable electrochemical cell of claim 5, wherein said MnO$_2$ electrode includes from 0.1% to 10% of said organic material selected from the group consisting of PTFB, polypropylene, and polyethylene.

8. The rechargeable electrochemical cell of claim 3, wherein said MnO$_2$ electrode further comprises from 0.1% to 5% of a hydrogen recombination catalyst selected from the group consisting of silver, oxides of silver, and compounds of silver.

9. The rechargeable electrochemical cell of claim 3, wherein said electrolyte has from 1% to 20% of zinc oxide dissolved therein.

10. The rechargeable electrochemical cell of claim 3, wherein said metal container is a nickel plated steel can.

11. The rechargeable electrochemical cell of claim 12, wherein said container is coated on its interior surface with a conductive carbon coating.

12. The rechargeable electrochemical cell of claim 3, wherein said negative electrode comprises a gel which includes metallic zinc powder and optionally zinc oxide powder, a gelling agent, and said aqueous electrolyte, so as to form a gelled powdered zinc negative electrode.

13. The rechargeable electrochemical cell of claim 12, wherein said negative electrode further comprises at least one additional metallic corrosion inhibitor in the range of 0.01% to 0.5% based on the zinc weight, wherein said metallic element is at least one element selected from the group consisting of mercury, lead, gallium and indium; and optionally 0.01% to 0.5% based on the zinc weight of an organic additive so as to retard zinc dendrite growth.

14. The rechargeable electrochemical cell of claim 12, wherein said gelling agent is selected from the group consisting of carboxymethyl cellulose, modified starches, polymethacrylates, polyacrylates, and mixtures or derivatives thereof.

15. The rechargeable electrochemical cell of claim 1, wherein said negative electrode further contains 1 to 15% of an additive chosen from the group consisting of hydroxides or oxides of magnesium, barium, and calcium, or mixtures thereof.

16. The rechargeable electrochemical cell of claim 1, wherein said separator comprises at least one barrier layer which is impermeable to zinc dendrites; wherein said barrier layer is an ion permeable membrane selected from the group consisting of cellulose, polyvinylalcohol, polypropylene, polyethylene, and combinations thereof.

17. The rechargeable electrochemical cell of claim 16, wherein said separator is a laminated separator having at least one electrolyte absorbent layer laminated to said barrier layer.

18. The rechargeable cell of claim 1, wherein said positive electrode further contains oxygen evolution catalysts including oxides, spinals or perovskites of nickel, cobalt, aluminium, zinc, iron, manganese, chromium, vanadium, titanium and silver.

* * * * *